United States Patent
Antia et al.

(10) Patent No.: US 6,347,124 B1
(45) Date of Patent: Feb. 12, 2002

(54) SYSTEM AND METHOD OF SOFT DECISION DECODING

(75) Inventors: Yezdi Antia; Ludong Wang, both of Gaithersburg; Mohammad Soleimani, Rockville; A. Roger Hammons, North Potomac, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/181,905

(22) Filed: Oct. 29, 1998

(51) Int. Cl.$^7$ ................................................. H03D 1/00
(52) U.S. Cl. ........................ 375/341; 375/262; 714/795; 714/780
(58) Field of Search ................................. 375/341, 262, 375/340; 714/759, 761, 762, 774, 780, 787, 788, 795, 794; 395/384

(56) References Cited

U.S. PATENT DOCUMENTS

| | | | | |
|---|---|---|---|---|
| 5,390,215 A | * | 2/1995 | Antia et al. .................. | 375/341 |
| 5,764,690 A | * | 6/1998 | Blanchard et al. .......... | 375/206 |
| 5,796,757 A | * | 8/1998 | Czaja .......................... | 714/789 |
| 5,867,538 A | * | 2/1999 | Liu .............................. | 375/341 |
| 5,889,791 A | * | 3/1999 | Yang .......................... | 714/752 |

* cited by examiner

Primary Examiner—Chi Pham
Assistant Examiner—Emmanuel Bayard
(74) Attorney, Agent, or Firm—John T. Whelan; Michael W. Sales (57) ABSTRACT

A system and method of soft decision decoding is disclosed. An average signal magnitude is generated from a plurality of message bits. A scale factor is generated in accordance with the average signal magnitude, and soft decision bits are generated by processing the message bits using the scale factor. The scale factor and soft decision bits are transmitted and received across a communication link. The soft decision bits are rescaled using the scale factor and then rounded to the nearest integer value. The rounded values are then decoded. The soft decision bits are generated using a quantization having at least two bits, and soft decision bits are preferably rescaled using at least five bits.

15 Claims, 7 Drawing Sheets

SYSTEM AND METHOD OF SOFT DECISION DECODING

BACKGROUND OF THE INVENTION (a) Field of the Invention

The present invention relates generally to soft decision decoding of digital data. More particularly, it relates to a system and method that uses soft decision decoding to provide a high receiver gain across low bandwidth communication links.

(b) Description of Related Art

Hard decision decoding methods for digital data transmissions are well known in the art. Hard decision decoding methods detect and/or correct bit errors by resolving the received bits into either a logical "1" or a "0." Forward error correction (FEC) block codes and convolutional codes are examples of the hard decision decoding methods that are in widespread use today.

Soft decision decoding methods are also known in the art. Soft decision decoding quantizes a received bit signal into more than two states or levels. For example, a five-bit soft decision decoding method quantizes received bit signals into thirty-two possible levels depending on their "closeness" to either a logical "1" or "0." These additional levels provide a measure of certainty or confidence that is associated with the bit values. Soft decision decoding methods use this confidence information to perform a variety of known statistical operations and algorithms that work to increase receiver gain, particularly in fading channels. These soft decoding schemes typically provide more receiver gain than would be possible with hard decoding schemes alone.

Soft decision decoding schemes are especially beneficial in receivers, such as cellular base stations, that receive wireless transmissions from one or more mobile user units because channel fading is a common and significant problem in these systems. Conventional soft decision decoding systems and methods, however, do not provide a workable solution to the fading problem for these existing cellular systems. Conventional soft decision systems and methods can provide higher receiver gain only by increasing the number of soft decision bits used to represent each and every bit signal. Thus, with conventional systems, system throughput may be substantially compromised by higher gains because each and every bit signal must carry the soft decision bit overhead across the communication link. Furthermore, system throughput requirements (i.e. the number of users) often limit these soft decision decoding schemes to three bits, which provides inadequate receiver gain in fading channels. Thus, there is a need for a system and method of soft decision decoding that improves receiver gain without compromising system throughput.

SUMMARY OF THE INVENTION

Accordingly, the present invention provides a method of receiving and processing a digital bitstream that provides increased receiver gain without compromising system throughput. The present invention is embodied in a soft decision encoding/decoding scheme, wherein a bitstream may be transmitted across a low bandwidth communication link as temporally spaced bursts of messages bits within a frame. A headend of the communication link individually processes and packages the bursts with a scale factor for transmission across the link. The scale factor may vary semi-dynamically (i.e., on a burst by burst basis). This scale factor is used at the tailend of the communication link to rescale, map, or expand the soft decision bits into a soft decision scheme having more bits than the scheme used at the headend of the communication link. Thus, using the present invention, the semi-dynamic gain information is sent once with each burst and does not produce bit overhead for each and every bit signal of the burst.

In accordance with the present invention, the average magnitude of the bit signals within a burst is measured and used to associate a scale factor with the burst. If the average magnitude of the bit signals is low then a scale factor providing a high gain is associated with the burst. Conversely, if the average magnitude of the bit signals is high then a scale factor providing lower gain is associated with the burst. The individual bit signals of the burst are represented using a multi-bit soft decision scheme that generates soft decision values based on the scale factor associated with the burst and the normalized bit signal value (i.e. the bit signal's closeness to a logic "1" or "0"). The scale factor and the soft decision values for the burst are then packaged together and transmitted across the communication link.

At the tailend of the communication link, the scale factor is stripped off the packaged burst of soft decision values/bits. The soft decision bits are then rescaled or mapped (i.e., expanded) into a multi-bit scheme having more soft decision bits than the scheme used at the headend of the communication link. This resealing or mapping is accomplished by combining the information contained in the scale factor for the burst with each of the soft decision values within the burst.

Accordingly, the present invention may be embodied in a soft decision decoding system and method that generates an average signal magnitude based on a plurality of message bits. A scale factor is generated in accordance with this average signal magnitude, and soft decision bits are generated by processing the message bits using the scale factor. Preferably, the soft decision bits are generated using a quantization having at least two bits, and soft decision bits are rescaled using at least five bits. The scale factor and soft decision bits are transmitted across a communication link, and received at a destination (e.g., a base station of a cellular communications system). The soft decision bits are resealed at the destination using the scale factor, then rounded to the nearest integer value. The rounded values are then decoded.

The present invention may also be embodied in an apparatus for receiving a plurality of message bits having a soft decision processor, a rescaler coupled to the soft decision processor, and a decoder coupled to the rescaler. The soft decision processor generates an average signal magnitude from the plurality of message bits, then generates a scale factor based on the average signal magnitude. The soft decision processor generates soft decision bits by quantizing the plurality of message bits in accordance with the scale factor. The rescaler generates rescaled soft decision bits using the scale factor and a quantization having at least four bits. The decoder generates decoded message bits from the rescaled soft decision bits using a soft decision algorithm.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
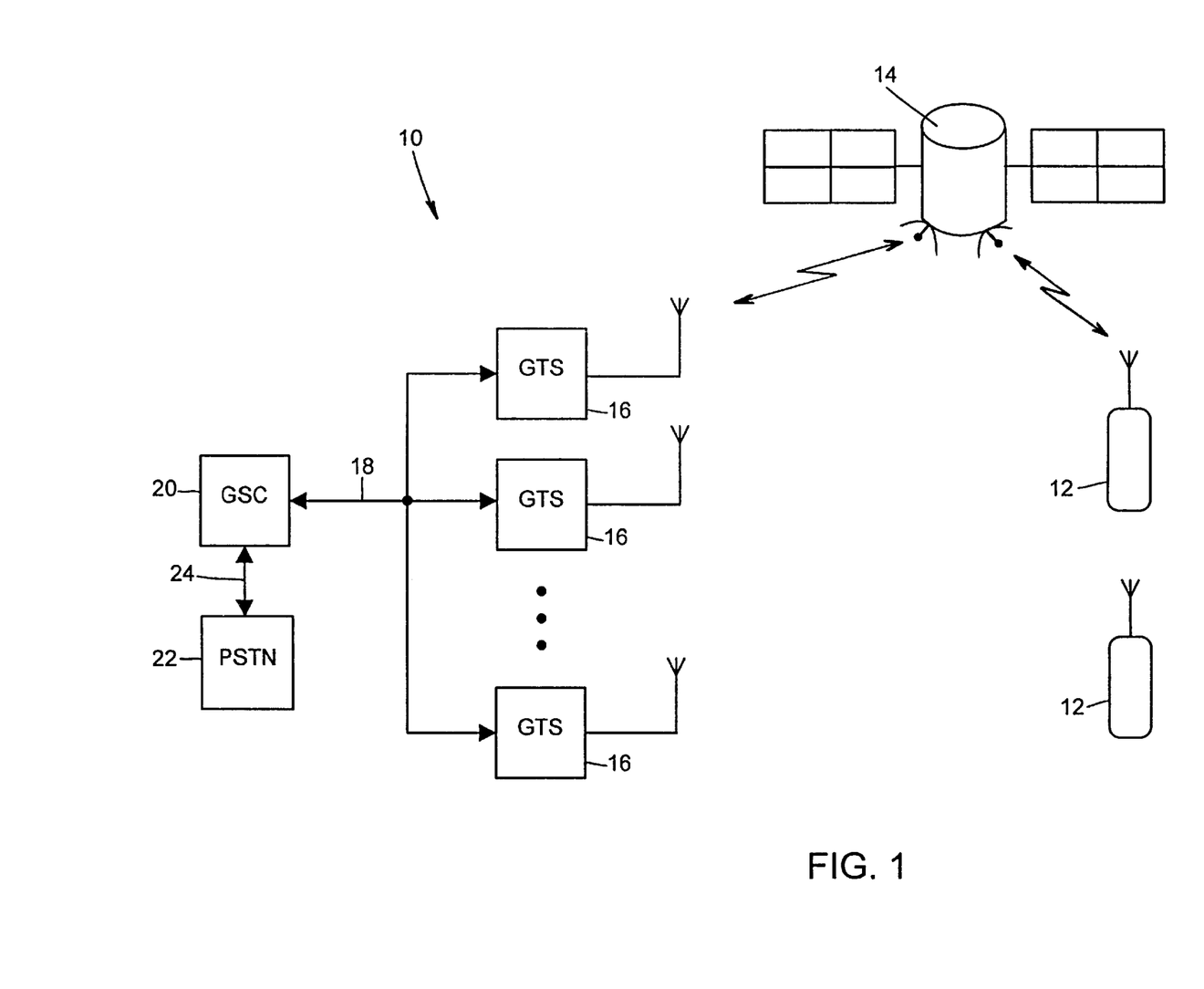
FIG. 1 illustrates a mobile communications system capable of implementing various aspects of the present invention.

Illustrated in FIG. 1 is a mobile communications system 10 capable of implementing various aspects of the present invention. One or more mobile user units 12 are in communication with a satellite 14. The satellite 14 is preferably in a stationary earth orbit and is in communication with one or more gateway transceiver sub-systems (GTSs) 16. The GTSs 16 convert signals received from the satellite 14 into a digital bitstream. The digital bitstream contains information associated with the mobile user units 12. As is well known in the art, the bitstream transmitted by the satellite 14 may include temporally spaced "bursts" of message bits within a frame. Typically, the bits associated with a given burst correspond to information received from a particular mobile unit 12. In addition, inter-burst interleaving may be used to reduce signal corruptions due to multipathing and other temporally extended interferences. As is known, inter-burst interleaving breaks burst message bits into several smaller interleaved burst packages each containing a portion of the bits making up an original digital message. The GTSs 16 are coupled via T1 lines 18 to a gateway station controller (GSC) 20. Additionally, the GSC 20 may be coupled to a public switched telephone network (PSTN) 22 via a network connection 24.

The mobile communications system 10 shown in FIG. 1 may be similar to that of a conventional cellular telephone system. For example, the mobile user units 12 may be remote mobile user telephones and the GTSs 16 may be cellular base stations. The GTSs 16 may each receive and route voice and data signals through hundreds of channels to and from the mobile user units 12.

The GTSs 16, inter alia, demodulate the various burst packages making up the bitstream received from the satellite 14. The GTSs 16 separate and associate demodulated burst packages with particular frequency channels (or phone calls). The GTSs 16 use a three-bit quantization to generate soft decision bits. The soft decision bits are generated so that each signal bit is associated with one of eight possible soft decision levels. The soft decision bits are then multiplexed by the GTSs 16 onto the T1 lines 18. The GSC 20 rescales the soft decision bits for a five-bit decoding process, de-interleaves the burst packages, and decodes the original message using an appropriate soft decision decoder, such as a Viterbi decoder. The GSC 20 then routes the individual calls/channels to the PSTN 22.

Figure 2:
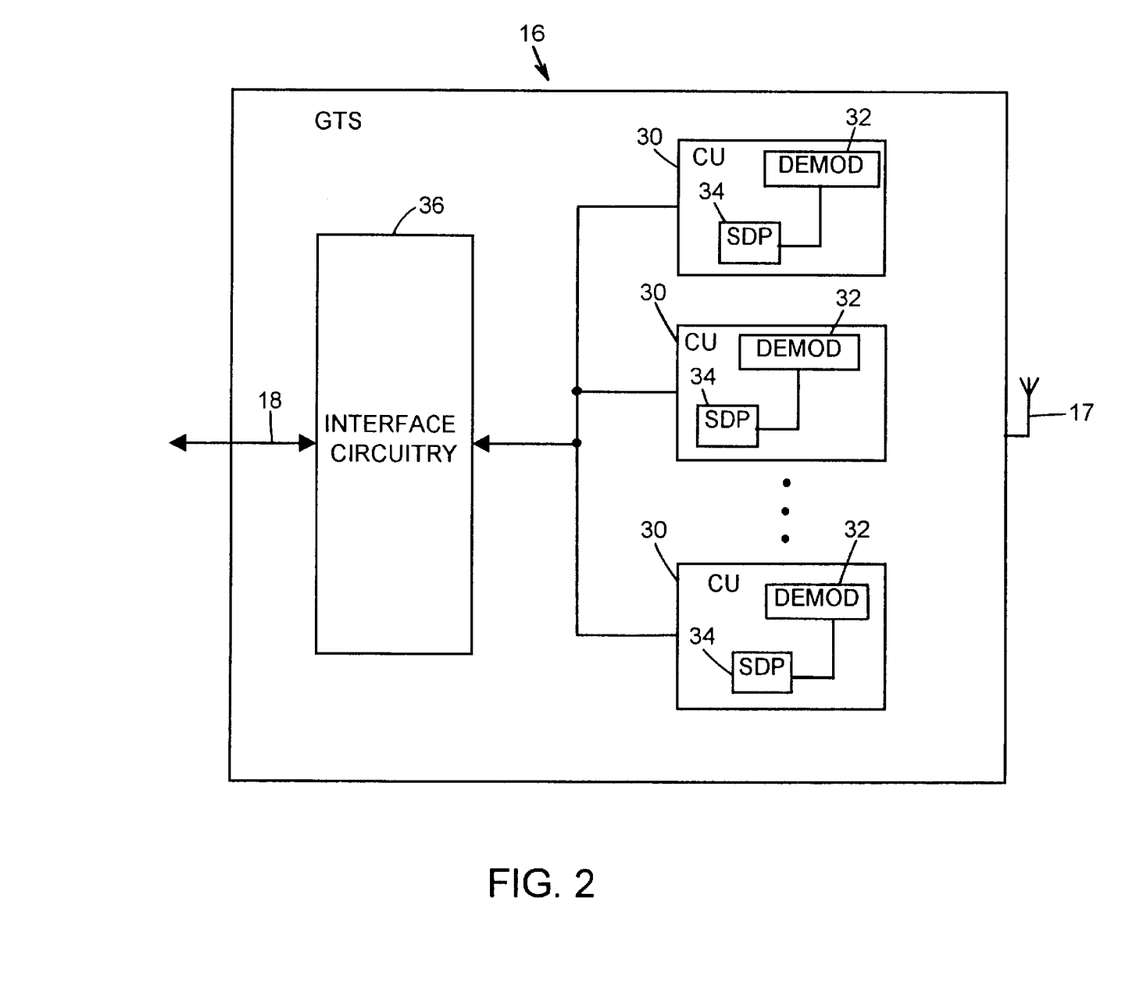
FIG. 2 is a block diagram illustrating a gateway transceiver sub-system that embodies aspects of the present invention.

FIG. 2 is a functional block diagram showing more details of a GTS 16 in accordance with the present invention. Voice and data signals are transmitted by the satellite 14 (shown in FIG. 1) in discrete bursts and are coupled to the GTS 16 through an antenna 17. The GTS 16 includes one or more channel units (CUs) 30 that include a demodulator 32 coupled to a soft decision processor (SDP) 34. The channel units 30 receive satellite signals from antenna 17, demodulate the signals in the demodulators 32, and process the demodulated signals in the SDPs 30. The SDPs 34 execute processing steps according to the present invention that encode the demodulated signals as three-bit soft decision values. The channel units 30 pass the soft decision values/bits through standard T1 interface circuitry 36 to the T1 lines 18.

Figure 3:
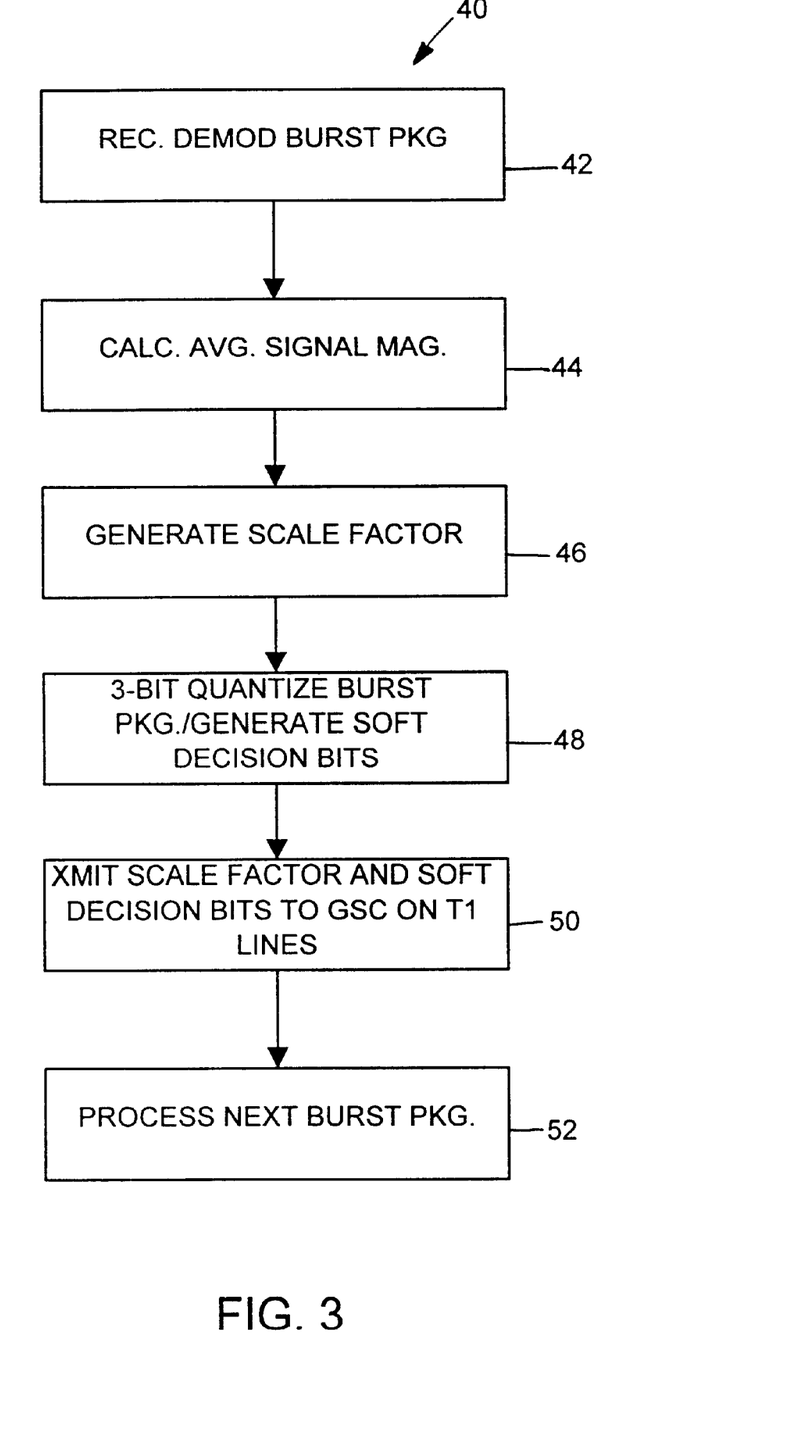
FIG. 3 is a flowchart depicting process steps executed by a soft decision processor in accordance with the present invention.

Now turning to FIG. 3, a flowchart is illustrated that depicts processing steps 40 performed by the SDPs 34. In a first step 42, the SDP 34 receives a demodulated burst package from the demodulator 32. The burst package may be an entire digital message composed of N bits, or if a conventional inter-burst interleaving transmission scheme is employed at the satellite 14 the burst package may be a portion of an N bit original message. For example, if inter-burst interleaving with a depth of three is used, then an N bit original message is transmitted from the satellite 14 to the GTSs 16 as three independent burst packages of N/3 bits that have been interleaved as is known in the art. In any case, the SDP 34, in a second step 44, calculates an average signal magnitude ($\bar{s}$) over the demodulated burst package using the following Equation 1.

$$\bar{s} = \frac{1}{L}\sum_{n=0}^{L}|s(n)| \quad \text{(Equation 1)}$$

In Equation 1, L equals the number of bits in the current burst package and s(n) equals the individual demodulated bit signals. In a third step 46, the SDP 34 generates a scale factor $A_{ul}^{(k)}$ for the burst package using the step function shown in Equation 2 below.

$$A_{ul}^{(k)} = \begin{bmatrix} 0.4 & \bar{s} < 0.5 \\ 0.6 & 0.5 \leq \bar{s} < 0.7 \\ 0.8 & \bar{s} > 0.7 \end{bmatrix} \quad \text{(Equation 2)}$$

The notation ul indicates "upper limit" (i.e. full scale) and the notation (k) represents the burst k for which the current scale factor is generated. As the average bit signal magnitude (calculated according to Equation 1) decreases, Equation 2 generates smaller scale factors. Thus, in a fading channel, if the average bit signal value for a burst is low (e.g., $\bar{s}$<0.5) then a small scale factor (e.g., 0.4) will be generated. As will be discussed in more detail below, generating smaller scale factors for bit signals having a low normalized average value increases fading channel gain because the scaling associated with subsequent processing steps (such as the generation of soft decision values) can be "focused" on a smaller range of normalized bit signal values.

The three scale factors (i.e., 0.4, 0.6, and 0.8) generated using Equation 2 have been empirically selected to optimize the fading channel performance of the disclosed three-bit soft decision scheme. Although Equation 2 provides three possible scale factors, more or fewer scale factors could be used without departing from the scope of the present invention. For example, four scale factors spaced across the interval zero to one may correspond to four intervals of the average signal magnitude ($\bar{s}$). A designer may vary both the number and value of possible scale factors along with the corresponding average signal magnitude intervals to suit the particular application.

The SDP 34 uses the scale factor generated in Equation 2 above in a fourth step 48 to three-bit quantize the burst package bits according to the following Equation 3, which generates soft decision bits representing the signal bits.

$$\hat{S}_{3-bit}(i) = \begin{cases} 0, & s(i) < -3 * A_{ul}^{(k)}/4 \\ m, & (m-4)*A_{ul}^{(k)}/4 \leq s(i) < (m-3)*A_{ul}^{(k)}/4 \\ 7, & s(i) \geq 3*A_{ul}^{(k)}/4 \end{cases} \quad \text{(Equation 3)}$$

Figure 3A:
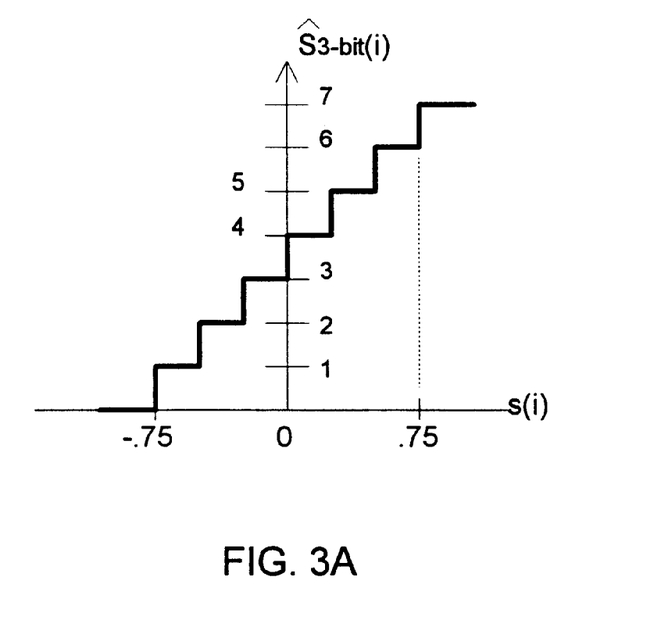
FIGS. 3A and 3B illustrate graphically the generation of soft decision bits in accordance with the present invention.
Figure 3B:
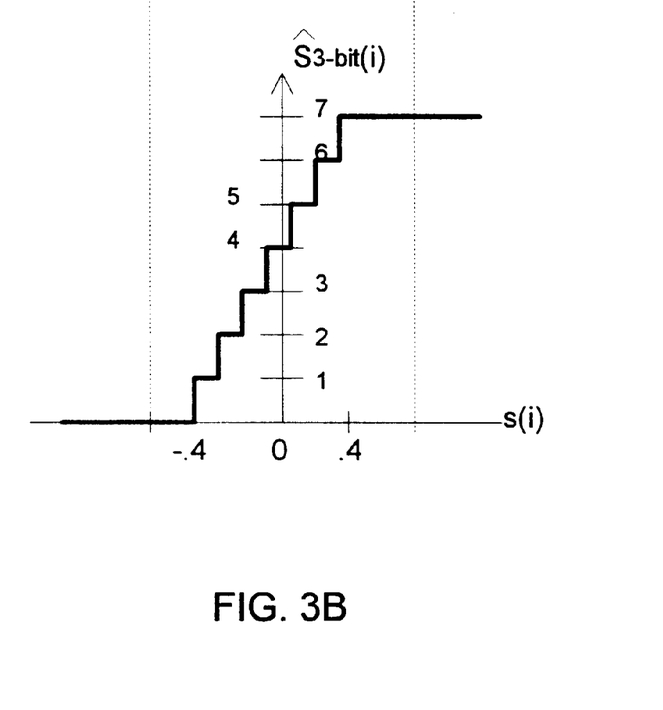

In Equation 3, m is a variable representing the soft decision values 1 to 6 (the other possible soft decision values 0 and 7 are given expressly). Thus, Equation 3 provides the eight soft decision levels 0 through 7 of the three-bit quantization. FIGS. 3A and 3B illustrate graphically the piecewise step function shown in Equation 3 for two different scale factors $A_{ul}^{(k)}$. Equation 3 is piecewise because it is defined by a series of discrete ranges of bit signal values, wherein each of the segments corresponds to a different expression (in this case a constant value 0–7) for the independent variable (i.e., the soft decision value). FIG. 3A shows the relationship between signal bits s(i) and the soft decision bits $\hat{S}_{3-bit}(i)$ for a scale factor $A_{ul}^{(k)}=1$. FIG. 3B shows this relationship for a scale factor $A_{ul}^{(k)}=0.4$. These graphical representations of Equation 3 are generated by plugging in the scale factor value (i.e., 1 and 0.4) and solving for $\hat{S}_{3-bit}(i)$ as s(i) varies from ∞ to +∞. As shown by the FIGS. 3A and 3B, when the scale factor is decreased, the gain is increased because a given Δs(i) produces a corresponding larger $\Delta\hat{S}_{3-bit}(i)$ (i.e., the slope of the relationship increases).

Performing the three-bit quantization of Equation 3 using $A_{ul}^{(k)}$ results in the semi-dynamic generation of soft decision bits because the quantization can vary on a burst by burst basis. More specifically, if the average signal magnitude is low (e.g., s̄<0.5) then the three-bit quantization (i.e., the values 0 through 7) will correspond to a smaller range of bit signal values s(i). Alternatively, if the average signal magnitude is high (e.g., s̄>0.7), the three-bit quantization will correspond to a larger range of bit signal values. This semi-dynamic generation of soft decision bits uses the scale factor $A_{ul}^{(k)}$ (Equation 2) for each burst to adaptively vary the scaling of the quantization function (Equation 3) so that the available range of soft decision values (e.g., 0–7) optimally corresponds to the actual range of bit signals values within each burst.

Although the disclosed embodiment uses a three-bit quantization, the number of quantization levels can be varied to suit the particular application. For example, a two-bit quantization, having four levels (e.g., 0 through 4) could be utilized without departing from the scope of the invention.

Referring back to FIG. 3, in a fifth step 50, the SDP 34 transmits the scale factor generated by the third step 46 and the soft decision bits generated by the fourth step 48 to the GSC 20 via the T1 lines 18. In a sixth step 52, the SDP 34 repeats the process 40 for the next burst package.

Figure 4:
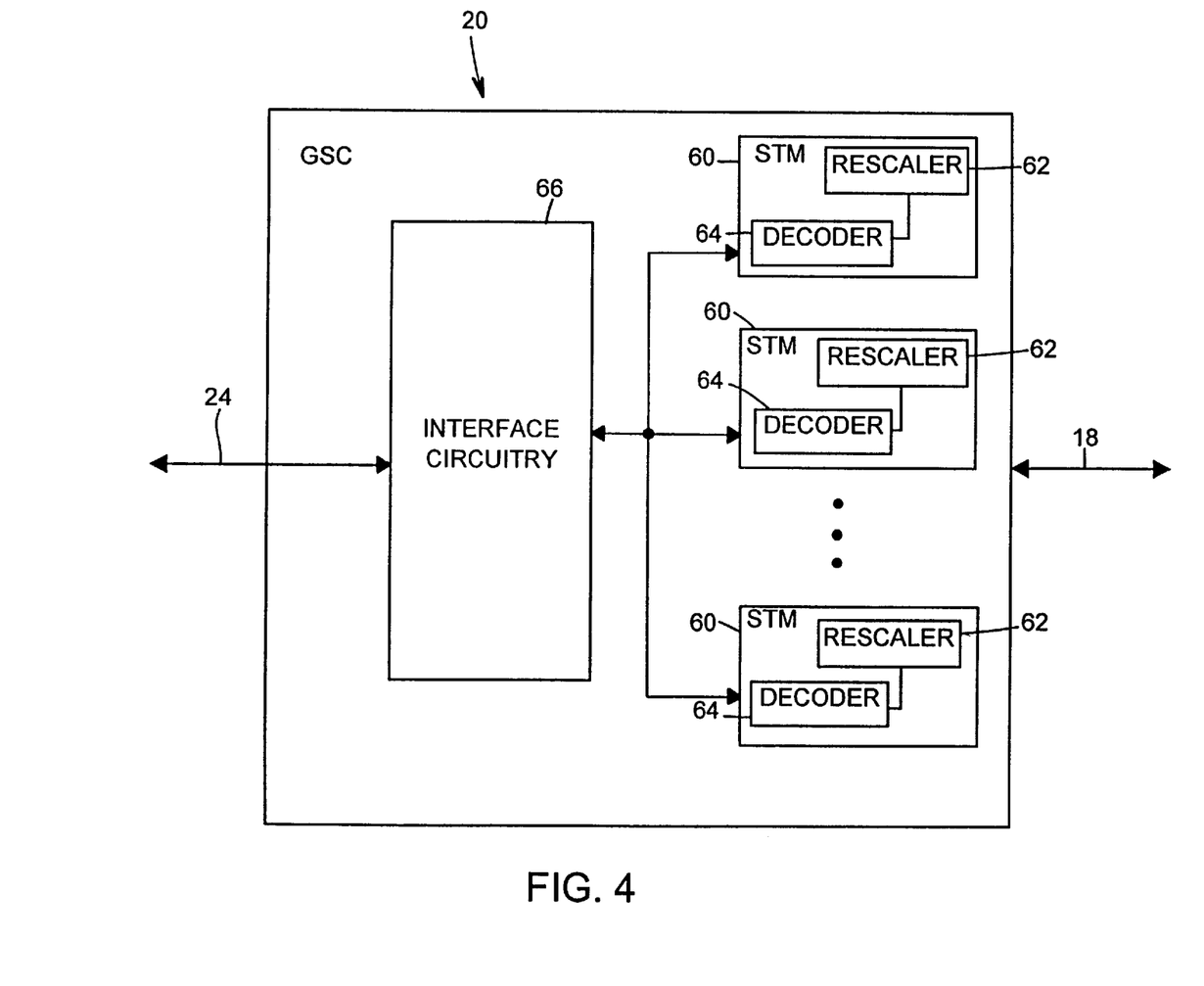
FIG. 4 is a block diagram illustrating a gateway station controller that embodies aspects of the present invention.

FIG. 4 is a more detailed illustration of the GSC 20 in accordance with the present invention. The GSC 20 includes one or more switch transcoder modules (STMs) 60. Each STM 60 includes a rescaler function 62 and a decoder function 64.

Figure 5:
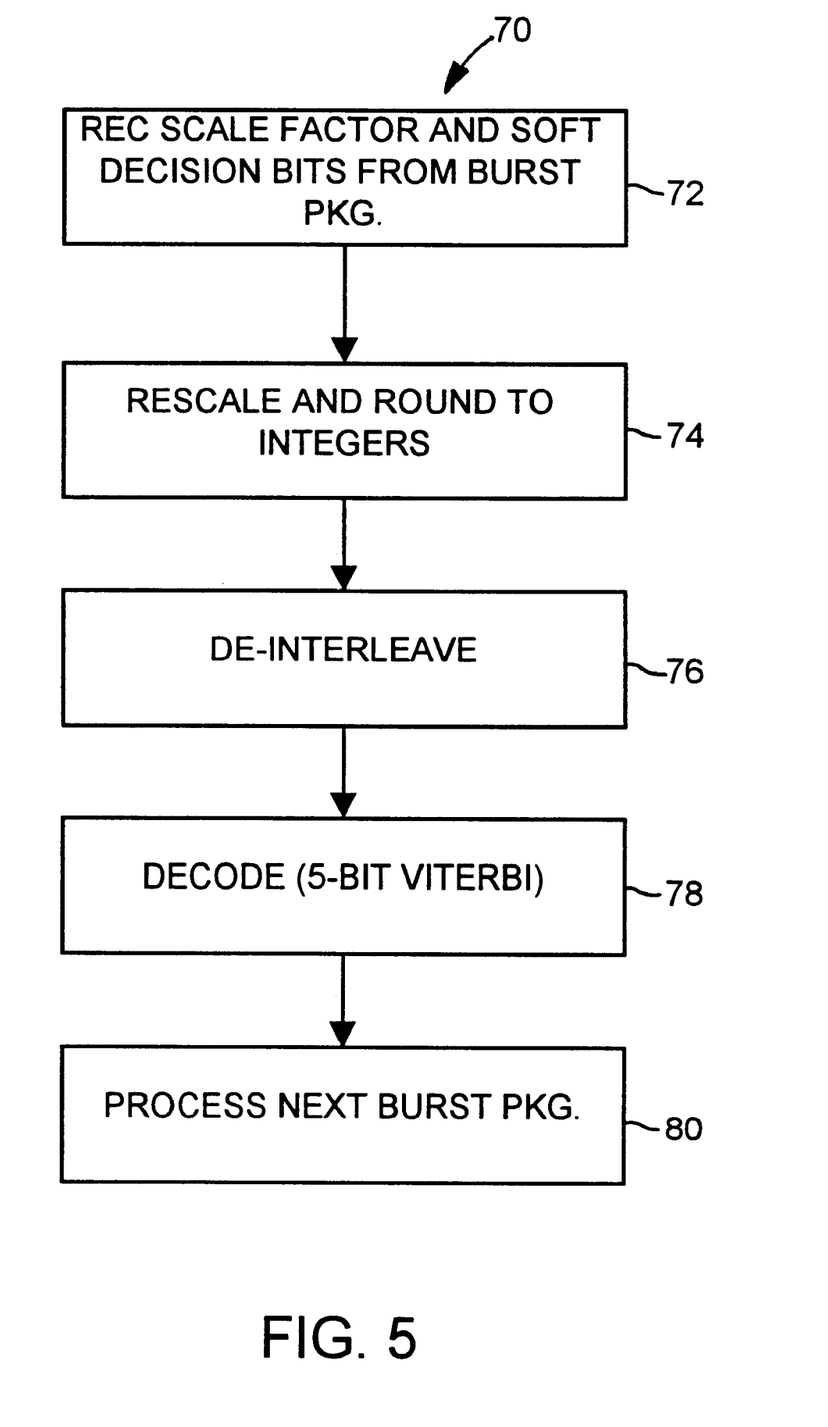
FIG. 5 is a flowchart depicting process steps executed by a station transceiver module in accordance with the present invention.

Turning to FIG. 5, a flowchart is illustrated that depicts processing steps 60 performed by the STM 50. In a first step 72, the rescaler 62 receives the scale factor and the associated soft decision bits for a burst package from the GTSs 16 via the T1 lines 18. In a second step 74, the rescaler rescales the soft decision bits in accordance with Equation 4 below.

$$\hat{S}_{rsc}(i) = \begin{cases} (\hat{S}_{3-bit}(i) - 3)*15*A_{ul}^{(k)}/3, & 0 \leq \hat{S}_{3-bit}(i) \leq 3 \\ (\hat{S}_{3-bit}(i) - 4)*15*A_{ul}^{(k)}/3, & 4 \leq \hat{S}_{3-bit}(i) \leq 7 \end{cases} \quad \text{(Equation 4)}$$

Equation 4 provides a resealing function that maps the three-bit soft decision values $\hat{S}_{3-bit}(i)$ generated using Equation 3 into a five-bit quantization. As shown by Equation 4, the resealed values $\hat{S}_{rsc}(i)$ are a function of the current scale factor value $A_{ul}^{(k)}$ (i.e., the scale factor used to generate the three-bit soft decision values transmitted from the GTSs 16), the three-bit soft decision value $\hat{S}_{3-bit}(i)$, and a scaling coefficient (i.e., 15/3=5). Thus, the resealed bits $\hat{S}_{rsc}(i)$ may have values ranging from +15 to −15 depending on the three-bit soft decision values $\hat{S}_{3-bit}(i)$ (i.e., 0–7) and the current scale factor value $A_{ul}^{(k)}$.

Figure 5A:
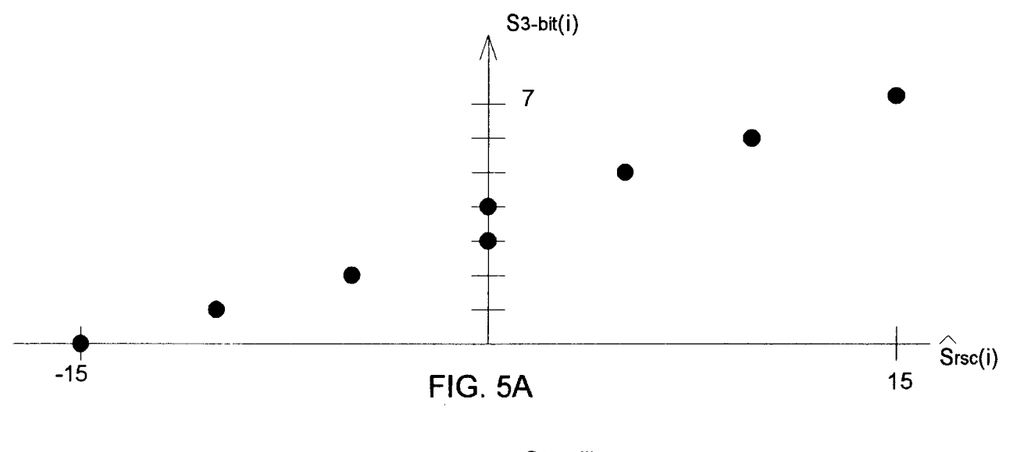
FIGS. 5A and 5B illustrate graphically the rescaling of soft decision bits in accordance with the present invention.
Figure 5B:
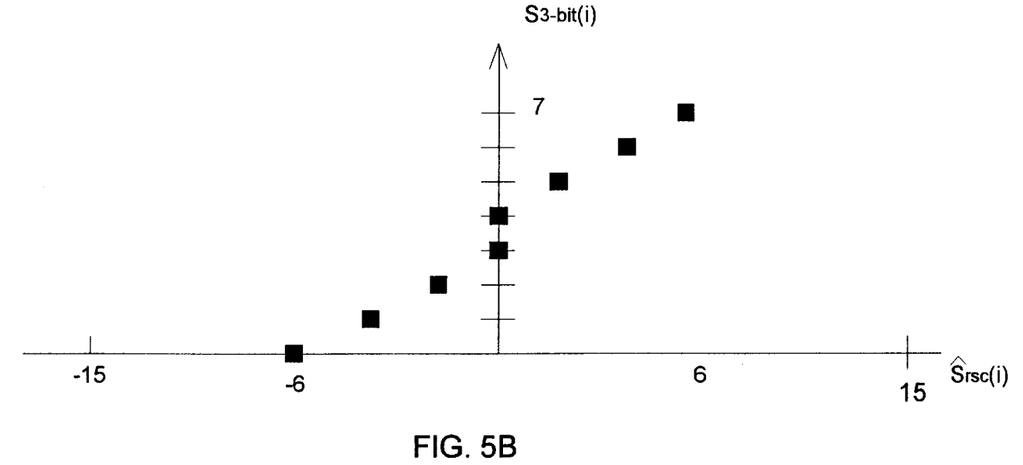

FIGS. 5A and 5B illustrate graphically this resealing or mapping function for two scale factor values. In FIG. 5A the scale factor $A_{ul}^{(k)}=1$, and in FIG. 5B the scale factor $A_{ul}^{(k)}=0.4$. These graphical representations of Equation 4 are generated by plugging in the scale factor value (i.e., 1 and 0.4) and solving for $\hat{S}_{rsc}(i)$ as $\hat{S}_{3-bit}(i)$ varies in integer steps from 0 to 7. As shown by FIGS. 5A and 5B, the semi-dynamic scale factor allows the eight possible soft values (i.e., 0–7) representing the bits within a given burst to be mapped into more than eight possible resealed values. Thus, the three scale factors of the present embodiment result in three resealing or mapping "footprints" of the eight soft decision values (0–7) as exemplified by FIGS. 5A and 5B.

The re-scaled soft decision bit values are then rounded to the nearest integer according to Equation 5 below.

$$\hat{S}_{5-bit} = \text{round}(\hat{S}_{rsc}(i)) \quad \text{(Equation 5)}$$

Again referring to FIG. 5, in a third step 76, the STM 60 de-interleaves the resealed soft decision bits. De-interleaving is well known in the art, and any of a variety of known de-interleaving techniques may be used with the present invention. In a fourth step 78, the soft decision bits are decoded by the decoder 64. The decoder 64 may employ standard soft decision decoding schemes that are well known in the art. For example, the decoder 64 may comprise a Viterbi decoding function. In a fifth step 80, the STM 50 processes the next burst package received via the T1 lines 18.

Thus, it can now be seen from the foregoing detailed description that the disclosed embodiment of the present invention achieves improved decision decoding by first partitioning the demodulation and decoding functions across a low bandwidth T1 link. Throughput across the T1 link is maximized by generating a scale factor for each burst package and soft decision bits from the demodulated data using a three-bit quantization within the GTS 16. The scale factor and soft decision bits are then transmitted across the T1 link and received by the GSC 20. The GSC 20 rescales the soft decision bits for five-bit decoding using the scale factor and then decodes the rescaled soft decision bits using a Viterbi decoder. The use of a semi-dynamic scale factor in conjunction with a resealing operation satisfies the throughput constraints of the T1 link 18 while increasing receiver gain in fading channels beyond that provided by a conventional three-bit soft decision decoding process.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of receiving and processing a digital bitstream, comprising the steps of:
   receiving a plurality of message bits;
   generating an average signal magnitude based on the plurality of message bits;
   generating a scale factor in accordance with the average signal magnitude;
   generating soft decision bits based on the scale factor and the plurality of message bits;
   transmitting the scale factor along with the soft decision bits;
   receiving the scale factor and the soft decision bits;
   generating rescaled soft decision bits by rescaling the soft decision bits using the scale factor;
   rounding the rescaled soft decision bits to the nearest integer; and
   decoding the rescaled soft decision bits.

2. The method of claim 1, wherein the step of generating rescaled soft decision bits is based on a rescaling having at least five bits.

3. The method of claim 1, wherein the step of generating rescaled soft decision bits is based on a rescaling having five bits.

4. The method of claim 1, wherein the step of decoding comprises a soft decision decoding.

5. The method of claim 1, wherein the step of decoding comprises a Viterbi decoding algorithm.

6. An apparatus for receiving a plurality of digital message bits;
   a soft decision processor;
   a rescaler coupled to the soft decision processor;
   a decoder coupled to the rescaler;
   the soft decision processor adapted to receive the plurality of message bits and generate an average signal magnitude therefrom;
   the soft decision processor further adapted to generate a scale factor based on the average signal magnitude and to generate soft decision bits by quantizing the plurality of message bits in accordance with the scale factor;
   the rescaler adapted to receive the scale factor and the soft decision bits;
   the rescaler further adapted to generate rescaled soft decision bits from the soft decision bits using the scale factor and a quantization having at least four bits; and
   the decoder adapted to generate a plurality of decoded message bits using a soft decision decoding algorithm.

7. The apparatus of claim 6, wherein the scale factor is selected from a predetermined set of scale factors.

8. The apparatus of claim 7, wherein the predetermined set of scale factors includes three normalized scale factors.

9. The apparatus of claim 6, wherein the soft decision bits are generated in accordance with a quantization having at least two bits.

10. The apparatus of claim 6, wherein the soft decision bits are generated in accordance with a quantization having three bits.

11. The apparatus of claim 6, wherein the message bits are associated with a burst.

12. The apparatus of claim 6, wherein the message bits are transmitted using inter-burst interleaving.

13. The apparatus of claim 6, wherein the rescaler is adapted to generate the rescaled soft decision bits from the soft decision bits using the scale factor and a quantization having five bits.

14. The apparatus of claim 6, wherein the decoder is a Viterbi decoder.

15. The apparatus of claim 6, wherein the soft decision processor is coupled to the rescaler with a T1 communication link.

* * * * *